(12) United States Patent
Peters et al.

(10) Patent No.: US 7,845,573 B2
(45) Date of Patent: Dec. 7, 2010

(54) MEDIA STORAGE DEVICE

(75) Inventors: Kenneth J. Peters, Dundee (GB); John A. Peebles, Dundee (GB)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 12/604,024

(22) Filed: Oct. 22, 2009

(65) Prior Publication Data

US 2010/0038420 A1 Feb. 18, 2010

Related U.S. Application Data

(63) Continuation of application No. 10/158,657, filed on May 30, 2002, now abandoned.

(51) Int. Cl.
*G06K 19/06* (2006.01)
(52) U.S. Cl. .................. 235/494; 360/85; 360/271.1; 242/341; 242/528
(58) Field of Classification Search .................. 235/494
See application file for complete search history.

(56) References Cited

U.S. PATENT DOCUMENTS

| 3,913,200 | A | 10/1975 | Kossor |
| 4,106,667 | A | 8/1978 | Lynott |
| 4,523,235 | A | 6/1985 | Rajchman |
| 4,574,557 | A | 3/1986 | Haberstroh et al. |
| 4,585,144 | A | 4/1986 | Granzow et al. |
| 5,220,157 | A | 6/1993 | Martin et al. |
| 5,432,646 | A | 7/1995 | Nakamura et al. |
| 6,164,585 | A * | 12/2000 | Lutz ........................... 242/528 |
| 6,378,770 | B1 | 4/2002 | Clark et al. |
| 2001/0003345 | A1 | 6/2001 | Watari et al. |

FOREIGN PATENT DOCUMENTS

| EP | 0 142 254 A2 | 5/1985 |
| EP | 0 735 513 A1 | 10/1996 |
| GB | 2 129 593 A | 5/1984 |
| JP | 2002041792 A | 2/2002 |
| WO | WO 00/52649 | 9/2000 |

* cited by examiner

*Primary Examiner*—Seung H Lee
*Assistant Examiner*—Tae Kim
(74) *Attorney, Agent, or Firm*—Michael Chan

(57) ABSTRACT

A storage device (10) for storing valuable media is described. The device has a rotary storage compartment (14) for storing media items (100) in a fixed order. The items are held in place by one or two tapes (16 and/or 18) wound around the rotary storage compartment. The device includes a memory (16 and/or 18) for storing the order in which the items are stored and details of transactions associated with the stored items, so that each stored item can be linked to a transaction. In a preferred embodiment, one of the tapes (16 or 18) serves as the memory so that transaction details for a stored media item (100) can be read as the stored media item (100) is dispensed from the storage device (10).

20 Claims, 4 Drawing Sheets

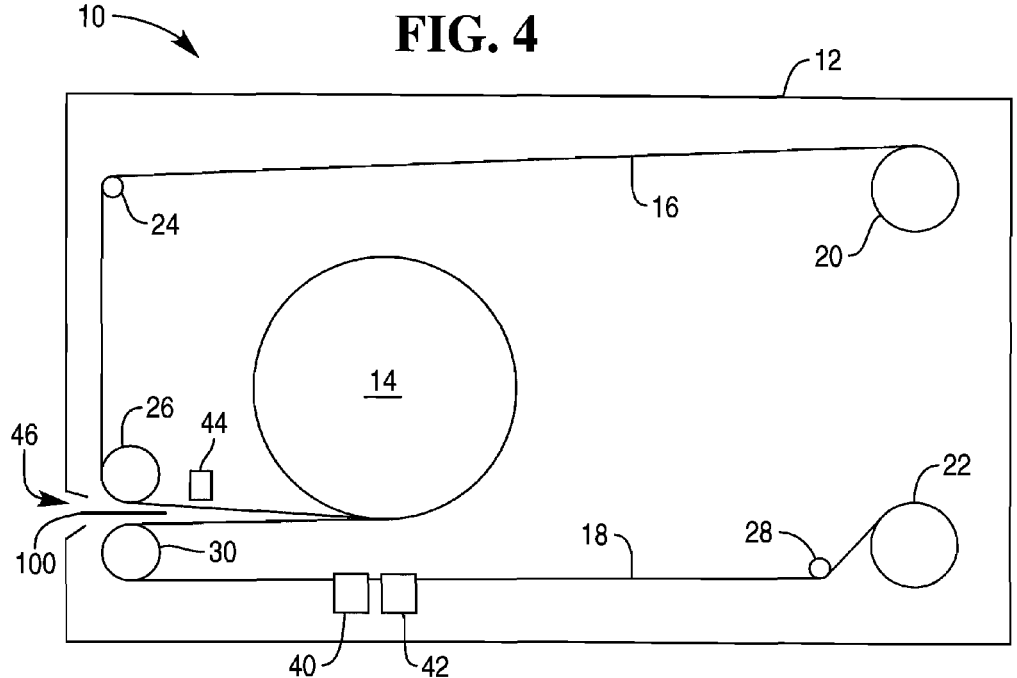
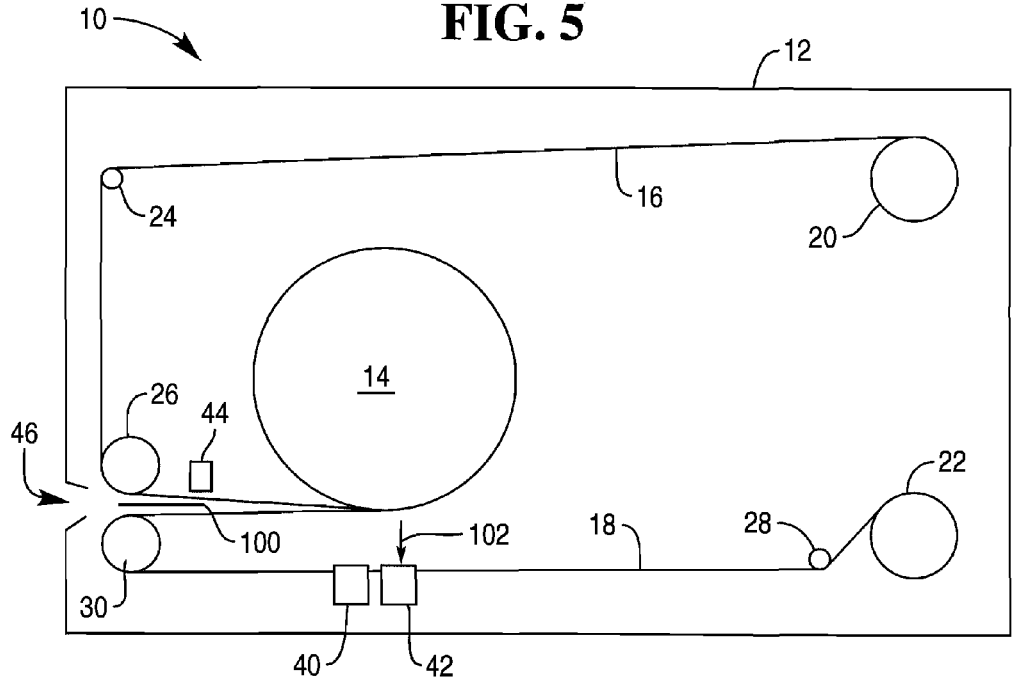

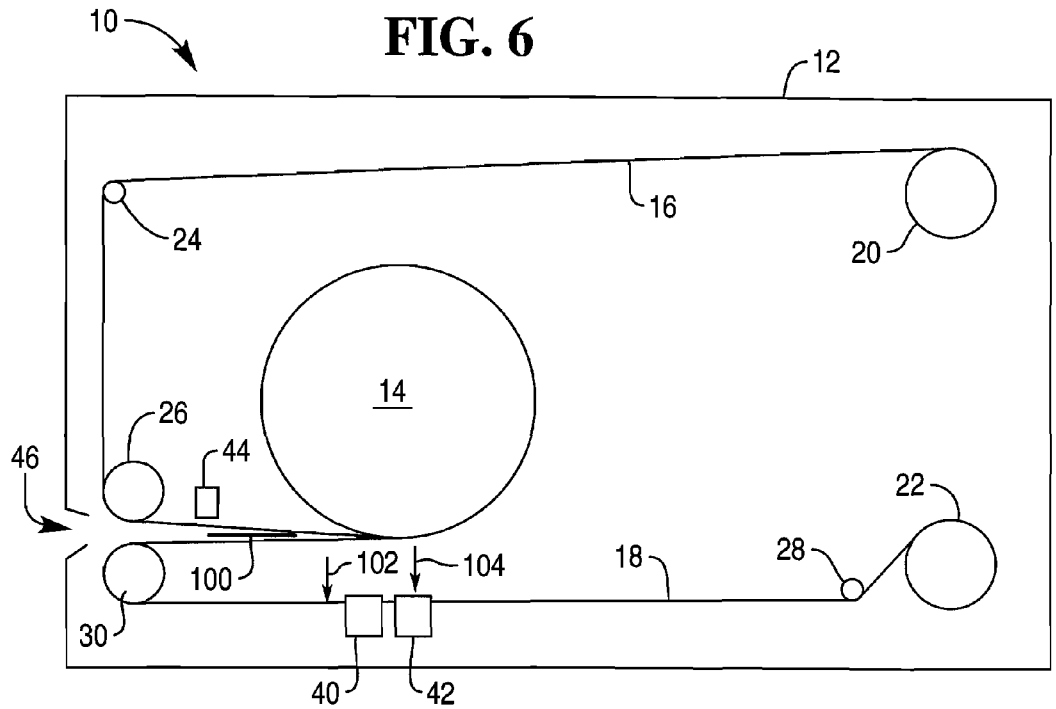
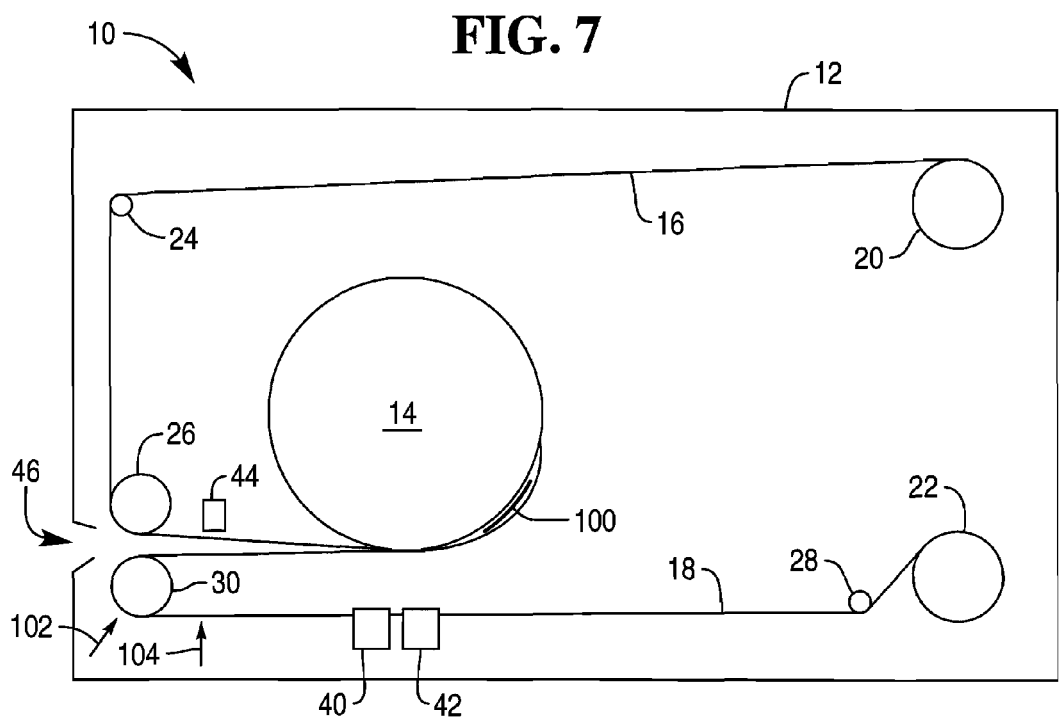

MEDIA STORAGE DEVICE

This application is a continuation application of application Ser. No. 10/158,657 filed May 30, 2002 now abandoned.

BACKGROUND OF THE INVENTION

The present invention relates to a storage device for storing valuable media, such as banknotes. In particular, the invention relates to a media storage device for use in a self-service terminal. The invention also relates to a self-service terminal (SST), such as an automated teller machine (ATM), incorporating such a storage device.

ATMs are public access terminals that provide a convenient, reliable, and secure source of cash and other financial transactions and services in an unattended environment.

ATMs typically include a storage device for storing banknotes that are not delivered to a user (rejected banknotes) or not removed by a user (purged banknotes). There are a number of reasons for a banknote being picked from a currency cassette but not being presented to a user, for example: if multiple notes are picked instead of a single note, then the multiple notes are diverted to the storage device; or, if a note is poorly stacked or has incorrect dimensions, then it will be diverted to the storage device. If notes are presented to a user and the user does not remove the notes, then the notes will be purged by retracting them and sending them to the storage device.

This storage device arrangement has a number of problems. These problems principally relate to reconciling the banknotes in the storage device with the transactions logged by the ATM to balance the cash put into the ATM with the cash remaining in and dispensed from the ATM. To perform this reconciliation, each banknote in the storage device must be associated with the transaction in which that banknote was sent to the storage device. This can be difficult because:

banknotes that have been purged become mixed with banknotes that have been rejected;

a user may remove some (but not all) banknotes from a bunch of presented banknotes, so that not all of the banknotes that were originally presented are purged;

multiple banknotes may be picked in a single operation and sent to the storage device, and it may be difficult to determine how many banknotes were picked in that single operation.

SUMMARY OF THE INVENTION

It is among the objects of an embodiment of the present invention to obviate or mitigate one or more of the above disadvantages or other disadvantages associated with prior art media storage devices.

According to a first aspect of the present invention there is provided a storage device for storing valuable media, the device having a rotary storage compartment for storing media items in a fixed order, characterized in that the device includes a memory for storing the order in which the items are stored and details of transactions associated with the stored items, so that each stored item can be linked to a transaction.

The term "media item" is used herein to refer to media that is conveyed as an individual unit; the media may be a single sheet or multiple sheets conveyed as a bunch. Thus, for example, a media item may comprise a plurality of banknotes conveyed as a bunch, or a single banknote. However, each "media item", whether a bunch of sheets or a single sheet, is stored separately from every other media item, and in a fixed order.

By virtue of this aspect of the invention, a media item that has been rejected or purged can be stored in a fixed position and the transaction during which the item was rejected or stored can be recorded and associated with the fixed position. This enables accurate reconciliation of the contents of the storage device, even after the storage device has been removed and transported. It also enables a reconciler to determine if any sheets were removed from a bunch of sheets presented to a user prior to the sheets being purged.

Preferably, the media items are stored in a last-in-first-out storage arrangement.

Preferably, the memory is incorporated into the storage device. Alternatively, the memory is external to the storage device.

In one embodiment, the rotary storage compartment is implemented by one or two storage belts wound around a storage drum, the media being held in place between opposite sides of the belt (where one belt is used), or between the belts (where two belts are used). In such an embodiment, the belt or belts may comprise magnetic tape (such as video or audio tape), and the storage device may include a recording head for recording data to the tape, and a reading head for reading data from the tape. In such an embodiment, the tape may serve as the memory. This has the advantage that the storage device includes the memory, and information relating to a stored item may be recorded at or near a portion of tape corresponding to the portion of tape that stores the item. This also has the advantage that the memory is non-volatile and does not require any power supply to maintain the contents of the memory.

According to a second aspect of the present invention there is provided a method of storing valuable media items, the method being characterized by the steps of: receiving media items to be stored; storing the media items in a fixed order; storing details of transactions associated with the stored items, in an order related to the order in which the items are stored.

Preferably, the step of storing details of transactions associated with the stored items includes the step of storing the transaction details on a magnetic tape (such as an audio or video tape) used for holding the items in a fixed order.

Preferably, transaction details relating to an item are stored on a portion of the tape that is read as the item enters or exits the storage device.

According to a third aspect of the present invention there is provided a self-service terminal including a storage device for storing valuable media, the terminal being characterized by a rotary storage compartment for storing media items in a fixed order, and memory for storing the order in which the items are stored and details of transactions associated with the stored items, so that each stored item can be linked to a transaction.

The memory may be located outside of the storage device but within the terminal; more preferably, the memory is located in the storage device so that if the device is removed, the memory remains with the device. Most preferably, the memory is incorporated within an integral part of the storage device.

The terminal may be an ATM.

The ATM may provide an automatic reconciliation feature, whereby the ATM removes the stored items from the media storage device (on a per item basis) and reads out the contents of the memory associated with each item.

The ATM may include software for reading the recorded information and transforming the information from reverse order to the order in which the recorded information was written. Alternatively, but less preferably, the storage device may write data in reverse order. This is less preferable because there may be less time available during the storage operation (for example, because another media item may require storage immediately after the current media item is stored) than during the reconciliation operation.

The ATM may report the contents of the storage device to a replenisher on a per item basis. The report may include details such as: whether an item was rejected or purged. For a purged item, the report may include:

the number of bills that should have been stored as an item,
  a transaction number, date, and time,
  the order of banknotes in the stored item, and
  the value of the stored item.

For a rejected item, the report may include:

any information from a note thickness sensor in the ATM relating to the thickness of the item;
  a transaction number, date, and time,
  information about which currency cassette a note was picked from; and
  any information from a media validator in the ATM relating to the dimensions or such like property of the item.

The memory may also store an ATM identification to enable identification of the ATM from which the storage device was removed.

By virtue of this aspect of the invention, a self-service terminal is provided with a storage device that can be removed and reconciled without requiring the terminal to be put out of service. This can be achieved by inserting a new storage device to replace the removed storage device.

Each of these aspects of the invention has the advantage that it is easier to reconcile the contents of the storage device with the value of media items sent to the storage device.

According to a fourth aspect of the present invention there is provided a media storage device characterized by a rotary storage compartment for storing media items in a fixed order using concentrically wound magnetic tape, and means for reading data from the magnetic tape.

Preferably, the media storage device also includes means for writing data to the magnetic tape. The means for reading data and writing data may be combined in a single read/write head. Alternatively, a dedicated read head and a dedicated write head may be used.

The magnetic tape may include index markings, to allow the storage device to locate portions of the tape more quickly.

The storage device may also be used to dispense the stored items.

By virtue of this aspect of the present invention, a media storage device can store information about the contents of the device (the stored media), characteristics of the tape motion, details of the storage position of a media item with respect to the tape position, the capacity of the storage device, transaction details, or such like information.

BRIEF DESCRIPTION OF THE DRAWINGS

These and other aspects of the present invention will be apparent from the following specific description, given by way of example, with reference to the accompanying drawings, in which:

FIGS. 4 to 7 are simplified schematic diagrams of the media storage device of FIG. 1, illustrating different stages of a storage operation.

DETAILED DESCRIPTION

Figure 1:
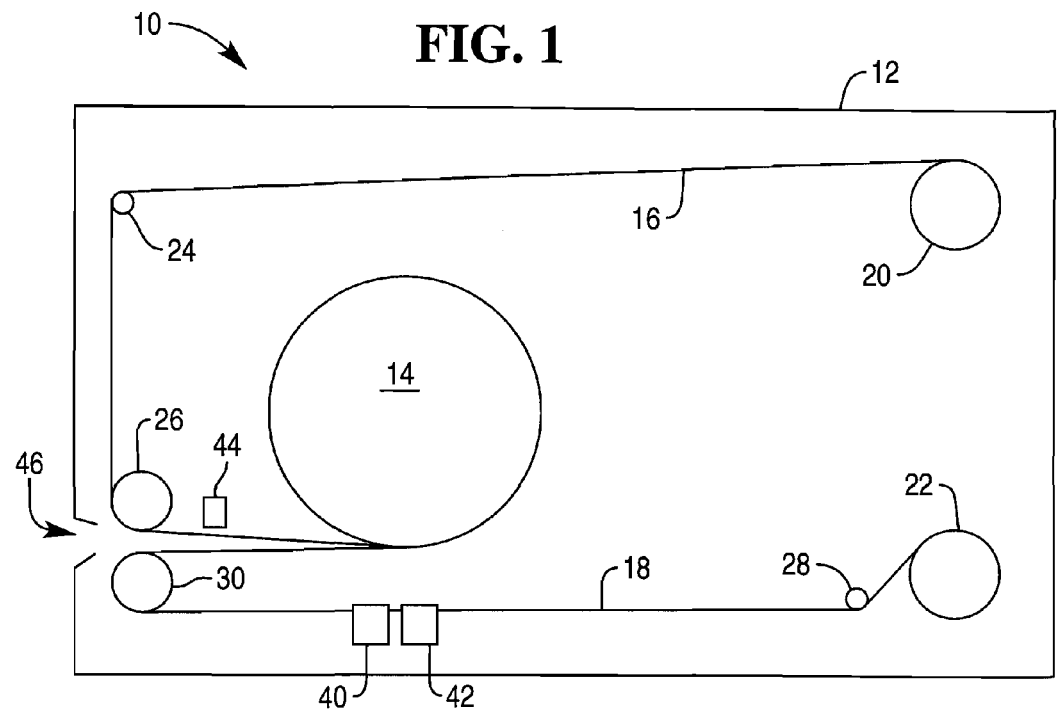
FIG. 1 is a simplified schematic diagram of a media storage device according to one embodiment of the present invention.

Referring to FIG. 1, a media storage device 10 according to one embodiment of the present invention comprises a metal housing 12 enclosing a rotary storage compartment 14 in the form of a drum, around which two belts 16,18 are concentrically wound. The belts 16,18 are in the form of video tape, and are supplied from upper and lower supply reels 20,22. Opposite ends of each tape 16,18 are connected to a supply reel 20 or 22 and the drum 14 respectively.

The upper tape 16 passes around a guide roller 24 and an upper pinch wheel 26; the lower tape 18 passes around a guide roller 28 and a lower pinch wheel 30. The pinch wheels 26,30 rotate in opposite directions and co-operate to nip a leading edge of a media item between the upper and lower tapes 16,18.

Storage devices are currently available that use such a drum and tape arrangement, for example, a UD 10 bunch note acceptance module, as supplied by Glory Limited (trade mark) 3-1 Shimoteno, 1-chome, Himeji, Japan.

The storage device 10 further comprises a magnetic read head 40, a magnetic write head 42, and a sensor 44 for detecting media items stored between the tapes 16,18. The metal housing 12 defines a media entry/exit port 46 adjacent the pinch wheels 26,30.

If the drum 14 is rotated in an anti-clockwise direction, then tape 16,18 is wound onto the drum 14 and any media item presented to the entry/exit port 46 is nipped between the tapes 16,18 at the pinch wheels 26,30, pulled towards the drum 14, and stored between the tapes 16,18 on the circumference of the drum 14.

If the drum 14 is rotated in a clockwise direction, then the tapes 16,18 are unwound from the drum 14 and wound around the supply reels 20,22, and any media items stored on the drum 14 are dispensed successively through the entry/exit port 46.

Figure 2:
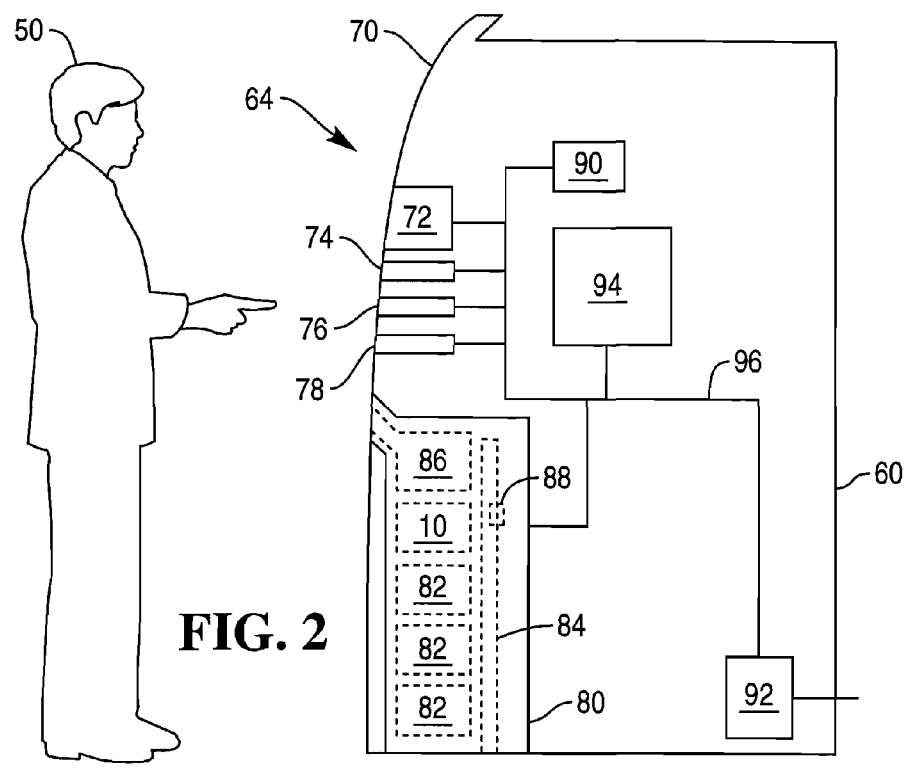
FIG. 2 is a simplified schematic diagram of an SST including the storage device of FIG. 1.

The storage device 10 may be used in an ATM, as illustrated in FIG. 2, which shows a user 50 operating an SST 60 (in the form of an ATM) including the storage device 10. The device 10 is removably insertable into a safe (not shown) in the ATM 60.

The ATM 60 includes a user interface 64 for outputting information and media (receipts, banknotes, cards, and such like) to a user and for allowing a user to input information (transaction details, personal information numbers, and such like) and media (checks, banknotes, cards, and such like).

The user interface 64 is a molded fascia 70 incorporating: a display module 72, an encrypting keypad module 74, and a plurality of slots aligned with modules located behind the fascia 70. The slots include a card entry/exit slot (not shown) that aligns with a magnetic card reader/writer (MCRW) module 76, a printer slot (not shown) that aligns with a printer module 78, and a cash dispense slot (not shown) that aligns with a cash dispense module 80.

The cash dispenser module 80 includes replenishable currency cassettes 82 for storing banknotes (three such cassettes are shown in FIG. 2), the storage device 10 for storing rejected and purged banknotes, a transport mechanism 84 for picking banknotes from the currency cassettes 82 and for transporting the picked banknotes, a presenter mechanism 86, and a conventional note thickness sensor 88.

The presenter mechanism 86 is operable to divert the banknotes to the storage device 10, or to present the picked banknotes as a bunch to the user 50. In the event that a user does not remove the presented banknotes, the presenter mechanism 86 is also operable to retract the presented banknotes and to transport the retracted banknotes to the storage device 10.

The note thickness sensor 88 is located within the transport mechanism 84 and measures the thickness of banknotes as they are conveyed by the transport mechanism 84.

The ATM 60 also includes an internal journal printer module 90 for creating a record of all transactions executed by the ATM 60 (referred to as a transaction log), a network connection module 92 for communicating with a remote transaction host (not shown) for authorizing transactions, and an ATM controller module 94 for controlling the operation of the various modules (72 to 92). All of the modules (72 to 80 and 90 to 94) within the ATM 60 are interconnected by an internal bus 96 for securely conveying data.

Figure 3:
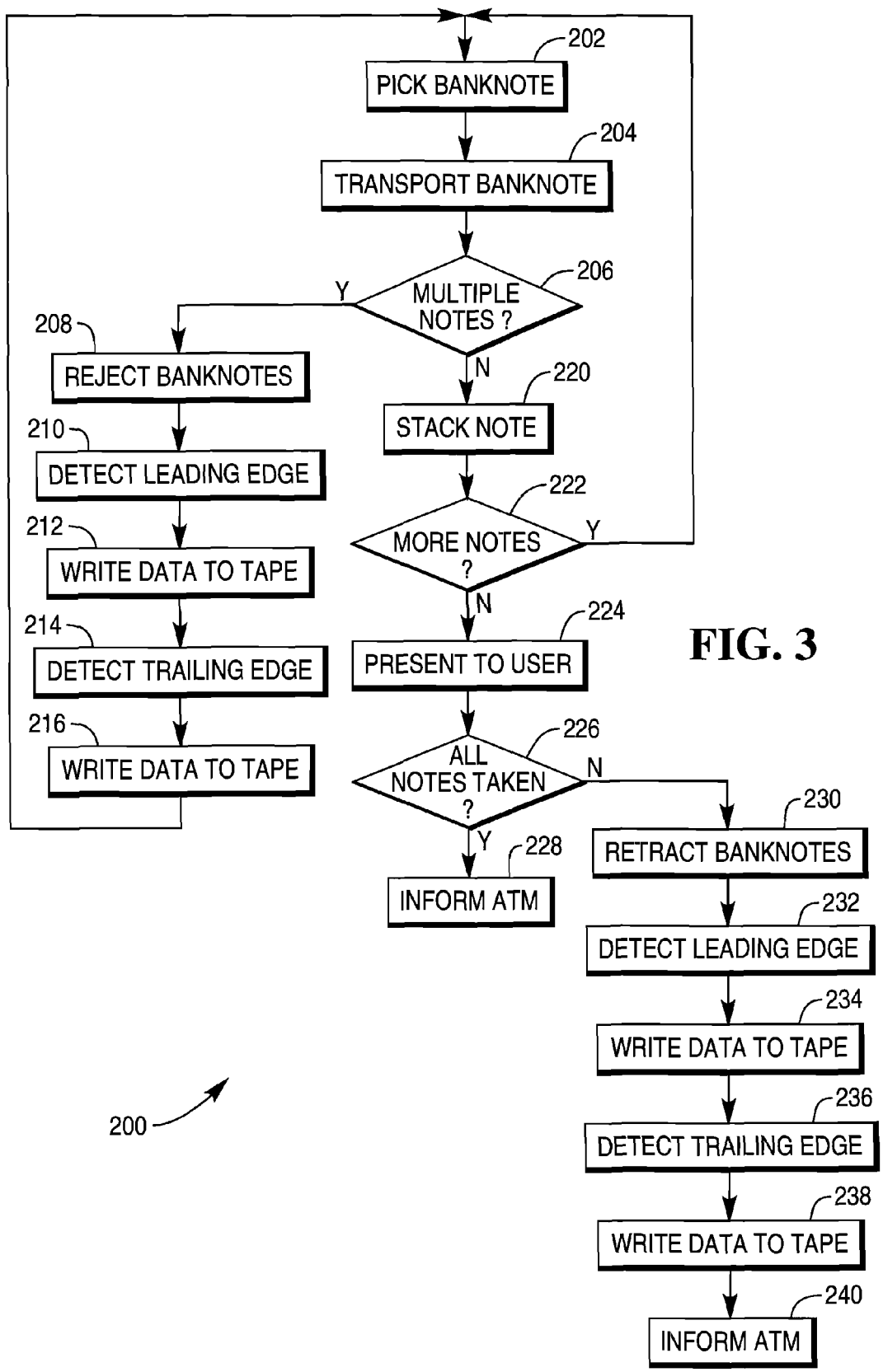
FIG. 3 is a flowchart illustrating some of the steps implemented by the SST of FIG. 2 in fulfilling a transaction.

The operation of the storage device 10 will now be described in more detail with reference to FIG. 3, which is a flowchart illustrating the steps implemented by the cash dispenser 80 in fulfilling a transaction (the transaction fulfillment process 200), and also with reference to FIGS. 4 to 7, which illustrate different stages of storing a media item.

If the user 50 requests, for example, cash withdrawal of fifty pounds, then the ATM controller 94 obtains authorization for this transaction and, when authorization has been received, instructs the cash dispenser 80 to dispense fifty pounds.

The cash dispenser 80 must pick individual notes from the currency cassettes 82 to the value of fifty pounds. Each cassette 82 contains only a single denomination value: one cassette 82 may contain twenty pound notes; the other two cassettes 82 may contain ten pound notes. The dispenser 80 determines which notes to pick to make fifty pounds (for example, two twenty pound notes and a ten pound note, or one twenty pound note and three ten pound notes). The dispenser 80 then picks (step 202) each of the required notes, and transports (step 204) each note individually through the note thickness sensor 88 to validate that only a single note has been picked (step 206).

If the note thickness sensor 88 detects multiple notes, then the presenter mechanism 86 diverts the multiple notes to the storage device 10 (step 208) by presenting the multiple notes as a single media item 100 (FIG. 4) to the entry/exit port 46 of the storage device 10.

The storage device 10 rotates the drum 14 anti-clockwise to draw in the media item (comprising multiple notes), as shown in FIG. 4.

When the sensor 44 detects the leading edge of the media item 100 (step 210), as illustrated in FIG. 5, then the write head 42 is activated, and stores the following transaction data:
   account details of the user 50 (which are received from the ATM controller 94);
   an indication that it is a reject operation because multiple banknotes were picked simultaneously.

This data is stored (step 212) on the lower tape 18 at the area indicated by arrow 102, as shown in FIG. 5. Arrow 102 indicates the area that is directly above the write head 42 when the sensor 44 detects the leading edge of the media item 100.

When the sensor 44 detects the trailing edge of the item 100 (step 214), the write head stores a sentinel (step 216) indicating that the trailing edge of the media item 100 has been detected. This sentinel is stored at the area indicated by arrow 104, as shown in FIG. 6. Arrow 104 indicates the area that is directly above the write head 42 when the sensor 44 detects the trailing edge of the media item 100.

It will be appreciated that in this embodiment, the distance between the transaction data starting and the sentinel is the same as the length of the media item 100, provided the transaction data can fit within this distance. This can be used to verify that the media item 100 has not been tampered with, as will be described in more detail below.

If the note thickness sensor 88 does not detect multiple notes then the picked note is stacked to form a bunch (step 220). If there are more notes to be picked (step 222), then the next note is picked (step 202) and the above process (steps 204 to 220) is repeated.

If no more notes are to be picked, then the bunch of notes is presented to the user 50 (step 224) by the presenter mechanism 86.

If cash dispenser 80 detects (step 226) that the user 50 has removed all of the presented notes from the ATM's dispense slot 86, then the cash dispenser 80 informs the ATM controller 94 that the transaction has been fulfilled (step 228).

If the cash dispenser 80 detects that the user 50 has not removed all of the presented notes from the ATM's dispense slot (step 226) within a predetermined time period, then the presenter mechanism 86 purges the notes by retracting the notes (step 230) and transporting them to the storage device 10.

The purged notes are stored in a similar manner to the rejected notes.

In a similar manner to step 210, when the sensor 44 detects the leading edge of the retracted bunch (step 232), then the write head 42 is activated, and stores the following transaction data:
   account details of the user 50 (which are received from the ATM controller 94);
   an indication that it is a purge operation because the bunch of banknotes was not removed by the user 50.

This data is stored (step 234) on the lower tape 18 in a similar manner as step 212.

When the sensor 44 detects the trailing edge of the retracted bunch (step 236), the write head stores a sentinel (step 238) indicating that the trailing edge of the retracted bunch has been detected. This sentinel is stored in a similar manner as for steps 214 and 216.

The cash dispenser 80 then informs the ATM controller 94 (step 240) that the transaction was not fulfilled because the bunch of banknotes was not removed by the user 50. The ATM controller 94 instructs the journal printer module 90 to record this in the transaction log.

It will be appreciated that in other examples the bunch may comprise a single note, for example, if a user withdraws a ten pound note.

When the storage device 10 is full, or when the ATM 60 is being replenished, the storage device 10 can be removed and an empty storage device inserted as a replacement. The removed storage device 10 can then be transported to a secure area for reconciliation by a reconciler.

To empty the storage device 10, the drum 14 is rotated clockwise. As the drum 14 rotates, the last media item stored is the first item that is dispensed because the drum 14 stores items in a last-in-first-out manner.

Immediately prior to the last media item passing underneath the sensor 44, the magnetic read head detects the sentinel associated with what was the trailing edge of the last media item, but what is now the leading edge of the last media item (because the media item is now being transported in the opposite direction).

The reason that there is a slight time delay between the sentinel being read and the sensor 44 detecting the edge of the last media item is because the read head 40 and the write head 42 are spaced apart by a small amount. This small spacing introduces a time delay. The storage device 10 may be coupled to a computer (not shown) that receives signals from the sensor 44 and the read head 40, and that compensates for the small time delay using the transport speed of the tape and the distance between the read and write heads 40,42.

After the sentinel has been read, the magnetic read head 40 then reads the stored transaction data (which is in reverse). This data can be transformed by a simple algorithm to re-create the transaction data as it was originally stored. The transaction data ends immediately before the sensor 44 detects the edge of the media item. This enables a reconciler to verify that the media item has not been moved, or replaced with a different sized item, since the item was stored.

This process is repeated until every media item stored in the storage device 10 has been removed.

As each media item is stored separately, and in a fixed order, with transaction details stored in the same fixed order, it is easy to associate each transaction with each media item.

In the event that a user had removed some, but not all, banknotes from a bunch of presented banknotes, the reconciler can easily detect this because the media item would store the incomplete bunch as a single item and would have transaction details associated therewith.

Furthermore, if any foreign object, such as a slip of paper similar in size to a banknote has been inserted instead of a banknote, then a reconciler would detect this and could immediately identify the transaction during which the foreign object was inserted.

After the read head 40 has read the transaction data for each media item, the write head 42 may be used to erase the tape 18; alternatively, the entire contents of the storage device may be removed prior to erasing the tape 18.

It will now be appreciated that the above embodiment of the present invention uses the magnetic properties of tape that is currently used for storing media items by physically holding the items against a drum, for storing data relating to the items held by the tape. Various modifications may be made to the above described embodiment within the scope of the invention, for example, in other embodiments, a single read/write head may be used rather than a dedicated read head and a dedicated write head. In other embodiments, the read/write heads may be located on the upper tape 16. In other embodiments, a single tape may be used. In other embodiments, the tape may have magnetic markings pre-written thereto, and the storage device may not include a write head. If the tape has pre-written markings, these may be used to calculate the transport speed of the tape. The read head may also be used to verify that the tape is moving, this may provide an indication of a malfunction in the event of the tape jamming or breaking. In other embodiments, the ATM may be used to perform an automatic reconciliation by emptying the contents of the storage device and displaying and/or printing the transaction details associated with each stored media item. In other embodiments, the transaction data stored may be different to that described in the above embodiment, for example: characteristics of media items determined by sensors may be stored; the order in which sensors were activated may be stored, as this may indicate an abnormal sequence of operation. It will be appreciated that the type of data stored may depend on the particular data of interest to an owner/operator of the storage device.

What is claimed is:

1. An automated teller machine (ATM) comprising: a banknote presenter mechanism to present banknotes to a user; and a storage device for storing banknotes comprising: a banknote port; a rotary drum; a winding and unwinding mechanism for winding a magnetic recording tape onto the rotary drum to store banknotes, and for unwinding the magnetic recording tape from the rotary drum to dispense stored banknotes through the banknote port; a magnetic write head for writing transaction details on the magnetic recording tape as the magnetic recording tape is wound onto the rotary drum and the banknotes are stored, the magnetic write head being arranged to write the transaction details at or near a portion of the magnetic recording tape corresponding to the portion of magnetic recording tape that stores the banknotes; and a magnetic reading head for reading the transaction details, as the magnetic recording tape is unwound from the rotary drum and the banknotes are dispensed.

2. The ATM of claim 1 further comprising:
   a plurality of currency cassettes, each containing a single denomination of banknote; and
   a transport mechanism for picking individual banknotes from the currency cassettes and transporting them to the banknote presenter mechanism for presentation to the user in a bunch of banknotes, wherein the banknote presenter mechanism retracts the bunch of banknotes if not taken by the user and transports the bunch of banknotes to the storage device.

3. The ATM of claim 2 further comprising:
   a banknote thickness sensor located within the transport mechanism for measuring the thickness of individual banknotes as they are conveyed through the transport mechanism, wherein if the banknote thickness sensor detects multiple banknotes passing therethrough together, as opposed to a single banknote, then the banknote presenter mechanism directs said multiple banknotes to the storage device.

4. The ATM of claim 1 wherein the storage device further comprises a banknote detector disposed between the banknote port and the rotary drum.

5. The ATM of claim 4 further comprising a controller and the banknote detector is an edge detector, wherein when a leading edge of a banknote, multiple banknotes, or bunch of banknotes is detected by the edge detector during storage, the magnetic write head is controlled by the controller to write a sentinel on said magnetic recording tape indicating the leading edge has been detected and to write said transaction details on the magnetic recording tape following the sentinel.

6. The ATM of claim 5 wherein when a trailing edge of the banknote, multiple banknotes, or bunch of banknotes is detected, the magnetic write head is controlled to store a sentinel on the magnetic recording tape indicating the trailing edge has been detected.

7. The ATM of claim 6 wherein when a trailing edge of a banknote, multiple banknotes or bunch of banknotes is detected during dispensing, the magnetic reading head is activated to read a corresponding portion of the magnetic recording tape storing the transaction details for said banknote, multiple banknotes, or bunch of banknotes.

8. The ATM of claim 1 wherein the storage device is a module which can be removed and replaced by an empty replacement module.

9. The ATM of claim 1 wherein the winding and unwinding mechanism comprises a first supply reel for supplying the magnetic recording tape and a second tape is supplied by a second supply reel, and stored banknotes are stored between the magnetic recording tape and the second tape as the two tapes are wound onto the rotary drum.

10. A banknote storage module for storing banknotes in an automated teller machine (ATM) comprising:
    a banknote port;
    a rotary drum;

a winding and unwinding mechanism for winding a first magnetic recording tape and second tape onto the rotary drum to store banknotes between the first magnetic recording tape and the second tape, and for unwinding the first magnetic recording tape and the second tape from the rotary drum to dispense stored banknotes through the banknote port;

a magnetic write head for writing transaction details on a portion of said magnetic recording tape as said magnetic recording tape is wound onto the rotary drum and the banknotes are stored, said portion with the transaction details being spaced a predetermined distance along said magnetic tape from where said banknotes are stored; and a magnetic reading head for reading the transaction details as said magnetic tape is unwound from the rotary drum and the banknotes are dispensed.

11. The banknote storage module of claim 10 further comprising a banknote edge detector disposed between the banknote port and the rotary drum.

12. The banknote storage module of claim 11 wherein when a leading edge of a banknote is detected by the banknote edge detector during banknote entry, the magnetic write head is controlled by a controller to write a sentinel on said magnetic recording tape indicating the leading edge has been detected and to write transaction details relating to the banknote on said magnetic recording tape following the sentinel.

13. The banknote storage module of claim 11 wherein the banknote edge detector is spaced along a path of travel of the magnetic recording tape a distance approximately equal to the predetermined distance.

14. The banknote storage module of claim 12 wherein when a trailing edge of the banknote is detected during banknote entry, the magnetic write head is controlled to write a sentinel indicating the trailing edge has been detected on the magnetic recording tape.

15. The banknote storage module of claim 14 wherein when a trailing edge of the banknote is detected during banknote exit, the magnetic reading head is activated to read a corresponding portion of a magnetic recording tape storing the transaction details for said banknote.

16. The banknote storage module of claim 10 wherein the banknote storage module is employed in an ATM and can be removed and replaced by an empty replacement module.

17. The banknote storage module of claim 10 wherein said portion is written as a particular banknote enters the storage module and is read as the particular banknote exits the storage module.

18. A method of operating a storage device for storing banknotes in an automated teller machine (ATM) and storing transaction information related to said banknotes in proximity thereto, the method comprising:

receiving a banknote at a banknote port;

winding a magnetic recording tape onto a rotary drum to store the banknote;

unwinding the magnetic recording tape from the rotary drum to dispense the banknote through the banknote port;

writing transaction details related to the banknote on a portion of the magnetic recording tape as the banknote enters the storage device utilizing a magnetic write head; and reading the transaction details from the portion of the magnetic recording tape as the banknote exits the storage device utilizing a magnetic read head.

19. The method of claim 18 further comprising: detecting a leading edge of the banknote as the banknote enters the storage device utilizing a banknote edge detector; and controlling the magnetic write head to write a sentinel on said magnetic recording tape indicating the leading edge has been detected and to write said transaction details on said magnetic recording tape following the sentinel.

20. The method of claim 18 further comprising:

detecting an edge of the banknote as the banknote exits the storage device utilizing a banknote edge detector; and controlling the magnetic read head to read a corresponding portion of the magnetic recording tape storing the transaction details for said banknote.

* * * * *